United States Patent [19]

Jones, Jr.

[11] 4,027,567

[45] June 7, 1977

[54] RAKE ANGLE CONTROL FOR SHEARS AND THE LIKE

[75] Inventor: Clarence O. Jones, Jr., Eggertsville, N.Y.

[73] Assignee: Niagara Machine & Tool Works, Buffalo, N.Y.

[22] Filed: Oct. 4, 1976

[21] Appl. No.: 728,929

[52] U.S. Cl. .................................. 83/624; 83/636; 83/640; 83/639; 91/171

[51] Int. Cl.² .......................................... B26D 5/12

[58] Field of Search ............ 83/624, 640, 636, 639; 91/171

[56] References Cited

UNITED STATES PATENTS

| | | | |
|---|---|---|---|
| 3,183,756 | 5/1965 | Dehn | 83/624 X |
| 3,349,669 | 10/1967 | Richardson | 91/171 |
| 3,911,775 | 10/1975 | Pearson | 83/636 X |

Primary Examiner—Frank T. Yost
Attorney, Agent, or Firm—Christel & Bean

[57] ABSTRACT

The invention relates to hydraulically powered shears for metal sheets and plates and particularly to an improvement in the means for adjusting and controlling the rake angle or slope of the movable shear knife in such machines. In the present disclosure a rod member is pivoted at one end and normally is disposed along a line parallel to the direction of reciprocation of the ram of the shear. The upright member has a cable connection with a servo valve which controls the fluid circuitry of the shear to adjust the relative positions of the hydraulic motor means at opposite sides of the ram to change the inclination of the ram.

When the rod member is in normal position the servo valve is blocked and the rake angle is maintained but when the rod member is adjusted angularly in either direction it operates through the cable means to adjust the servo valve in one direction or the other to change the relative vertical positions of the motor means. This operation of the servo valve changes the rake angle of the ram and its associated shear knife and at the same time restores the rod member to its normal position wherein the servo valve is in a blocking position and the adjusted angle is maintained.

8 Claims, 4 Drawing Figures

2

RAKE ANGLE CONTROL FOR SHEARS AND THE LIKE

BACKGROUND OF THE INVENTION

This invention relates to hydraulically powered shears of the type used in cutting metal plates and sheets and more particularly to means for readily and efficiently adjusting the rake angle or slope of the upper movable shear knife.

The desirability of adjusting the angular disposition of one shear knife relative to the other in a shear is well known and this is customarily accomplished by employing a fixed horizontal lower shear knife and a vertically reciprocable upper shear knife which is angularly adjustable. An example of a rake angle or slope control adjustment for hydraulic shears is found in my prior U.S. Pat. No. 3,129,625 dated Apr. 21, 1964.

In this prior patent the slope adjusting mechanism has direct mechanical engagement with a servo valve which operates to adjust the relative vertical elevations of the operating members of the two hydraulic cylinders which are disposed at opposite sides of the upper portion of the shear for effecting power strokes of the ram and the shear knife carried thereby. This arrangement dictates and requires a construction wherein the rake angle adjusting servo valve is located adjacent to the mechanical means which is manually adjusted to produce desired rake angles and this leaves the rake angle servo valve relatively remote from the other hydraulic controls of the machine, thus requiring conduits of substantial length between the servo valve and the other hydraulic controls of the machine.

Other prior art proposals which seek to locate the rake angle servo valve more conveniently with respect to the other hydraulic controls involve tape or cable connections between the shear frame, the upper movable shear knife or the supporting ram therefore, and the slope adjusting servo valve. While this arrangement accomplishes its intended purpose as outlined above, it requires tape or cable means which extends entirely across the shear from one side to the other.

SUMMARY OF THE INVENTION

The present invention provides a rake angle adjustment which is extremely simple and which accomplishes the desired purpose of locating the slope adjusting servo valve adjacent to the other hydraulic controls and relatively remote from the mechanical slope adjustment mechanism but does not require the tape or cable which extends entirely across the machine in prior art devices of this type.

In the present arrangement a tape or cable is only a small fraction of the length of similar tapes or cables of prior art machines and is located entirely at one side of the shear frame. The tape or cable extends more or less directly upwardly from the mechanical rake angle setting mechanism to the rake angle adjusting servo valve which is disposed substantially above the mechanical rake angle setting mechanism to the rake angle adjusting servo valve which is disposed substantially above the mechanical adjusting means. The present arrangement is, accordingly, very much simpler and more effective than rake angle adjusting means of hydraulic shears of the prior art. Furthermore, the rake angle adjusting means of the present invention provides a much simpler readout of the angle at which the movable shear knife is disposed than comparable arrangements of the prior art.

DESCRIPTION OF THE ILLUSTRATED EMBODIMENT

Figure 1:
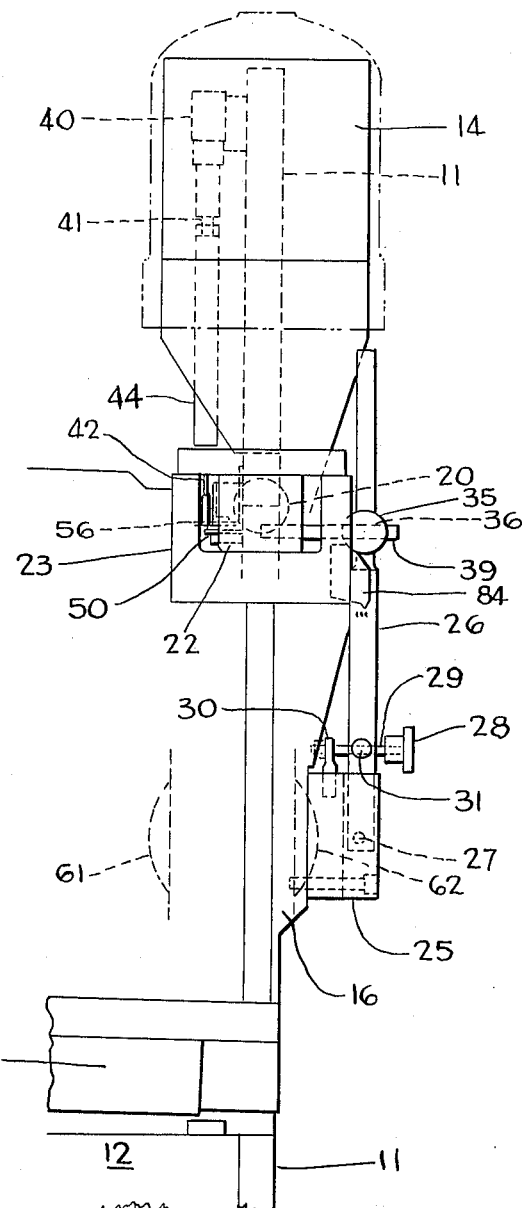
FIG. 1 is a fragmentary front elevational view of the right hand side of a hydraulic shear equipped with one form of the rake angle adjusting means of the present invention.

The rake angle or slope control arrangement of the present invention is intended to be employed in a power shear for metal sheets and plates of the general type illustrated in my prior U.S. Pat. No. 3,129,625 dated Apr. 21, 1964. In such shears, hydraulic operating cylinders are supported at opposite ends of a shear frame above a vertically reciprocating ram which carries the movable shear knife. The piston rods of the hydraulic operating cylinders have ball joint connection at their lower ends with opposite ends of the reciprocating ram. This general construction of hydraulic squaring shears is well known in the sheet metal working art.

In the drawings the numeral 10 designates generally a frame or housing which includes oppositely disposed vertically extending sidewalls 11 and a bed 12 which connects rigidly between the sidewalls and is provided with a lower stationary shear knife 13. The right hand hydraulic operating cylinder is shown at 14 in the drawings and it is to be understood that a similar hydraulic operating cylinder is provided at the opposite side of the housing 10.

A vertically reciprocable ram is shown at 16 in the drawings and a movable shear knife 17 is fixed to the lower portion thereof for coaction with stationary shear knife 13. A ball 20 at the lower end of the piston rod 21 of right-hand hydraulic cylinder 14 seats in a block 22. Block 22 is retained in a bracket 23 of ram 16 in such manner that it may freely adjust its position in a lateral direction during rake angle or slope control adjustment of ram 16 but is retained against relative vertical movement with respect to ram 16. The piston rod of the left-hand hydraulic operating cylinder (not shown) has a similar ball joint connection with a similar horizontally slidable block at the left-hand upper corner of ram 16.

In rake angle or slope control adjustments of ram 16 the ram pivots about an axis which in the present instance is in a common horizontal plane with pivot 27 of rod 26. This pivotal arrangement is well known and is substantially the same as in my prior U.S. Pat. No. 3,129,625. A pair of arcuate blocks 61 and 62 are seated in arcuate recesses in gib formations 63 of ram 16 and are free to rotate in such recesses. The flat faces of blocks 61 and 62 have vertical sliding engagement with the opposed vertical surfaces of a gib block 65 which is fixed to the right-hand end of frame 11. The left-hand end of ram 16 (not shown) is merely slidably guided by fore and aft surfaces of frame 11 which restrain the ram against relative movement in a direction from front to rear of the shear but provide ample clearance in a side-to-side direction to permit free pivotal movement of the ram during rake angle adjustment.

Reference will now be had to the novel means of the present invention which provides a simple, accurate and reliable means for adjusting the rake angle or slope of the ram 16 and the movable shear knife 17 and for maintaining the adjusted positions thereof. A block 25 is fixed to the right-hand side of ram 16 and is slotted to receive the lower end of a vertically extending rod 26. Rod 26 is pivoted to block 25 as at 27.

The inclination of rod 26 about its pivotal connection 27 is adjusted, for a purpose which will presently appear, in the following manner. An adjustment knob 28 is fixed to the outer end of a screw 29 which is rotatably supported at its inner end in a bearing 30 attached to block 25. Screw 29 threads through a pin 31 which is rotatably disposed in rod 26. By this means, rotation of adjustment knob 28 in either direction moves the rod 26 pivotally about the pivot 27 in either direction.

Figure 2:
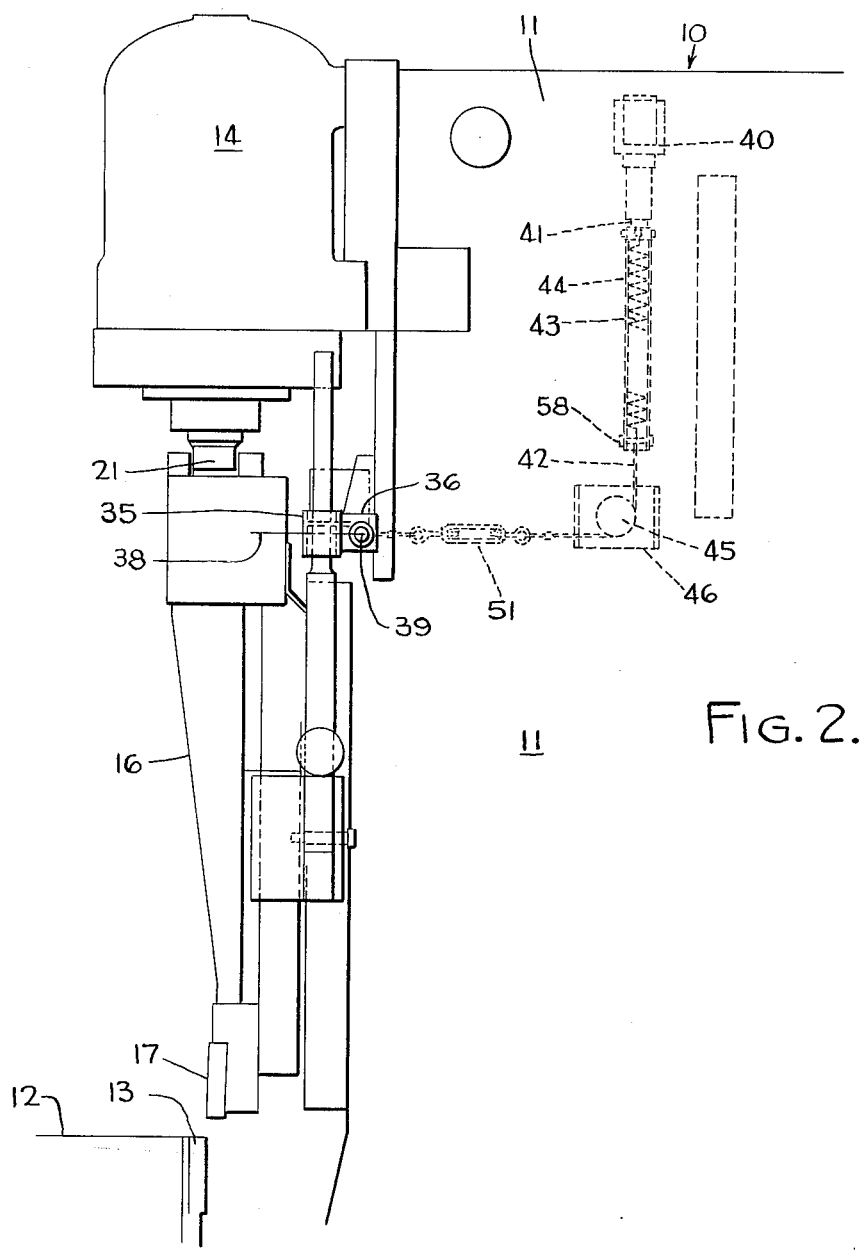
FIG. 2 is a side elevational view of the structure shown in FIG. 1.

A pair of cylindrical members 35 and 36 are connected end to end for free relative rotation with respect to each other on an axis indicated by the center line 38 in FIG. 2. For this purpose member 35 has a reduced extension 37 which seats in a bore in the adjacent face of member 36 and is held therein by a Truarc C-clip. The member 35 is bored to receive the upper end of rod 26 whereby the latter is freely slidable vertically with respect to member 35. The member 36 has a horizontal bore which receives a rod 39 which is threaded into housing sidewall 11 so that rod 39 is in a relatively fixed position with respect to the housing.

Figure 3:
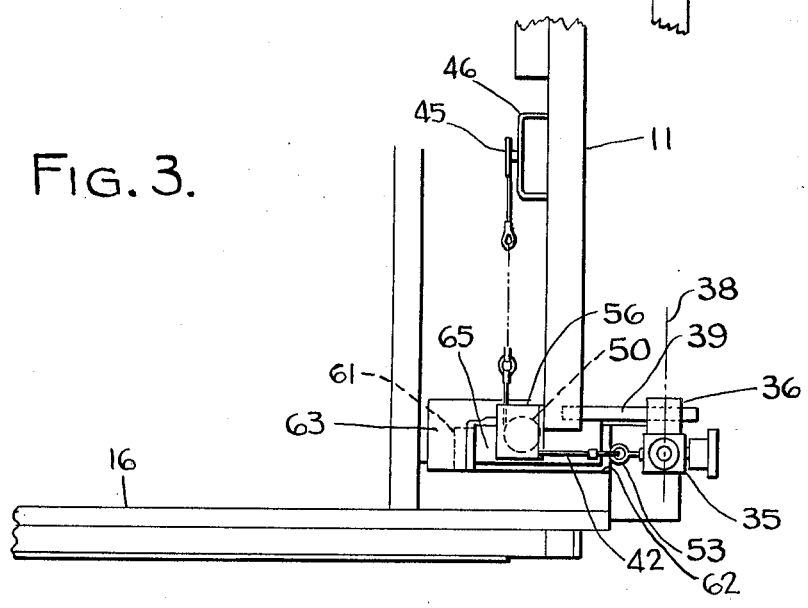
FIG. 3 is a top plan view thereof.

Reference will now be had to a flexible cable connection between block 35 and a level control valve 40 which will later be described more fully. As best shown in FIG. 2, valve 40, which in the present example is fixed to the inner face of the right hand sidewall 11, has a depending control rod 41 which connects with a cable 42 by way of an adjusting over-travel spring 43 disposed in tubular housing 44. Cable 42 extends downwardly and about a pulley 45 which is mounted against the inner face of wall 11 by means of a bracket 46, thence forwardly to a horizontally disposed pulley 50. A tensioning turnbuckle 51 is interposed in this portion of cable 42. As best shown in FIG. 3, cable 42 passes about pulley 50 and thence laterally outwardly for connection with a screw eye 53 which is fixed to block 35. Pulley 50 is mounted for free rotation by a bracket 56 which is likewise attached to the inner face of sidewall 11.

Extension coil spring 43 is fixed at its lower end to a pin 58 at the lower end of tube 44 and the adjacent end of cable 42 is likewise fixed to pin 58. When the parts are in the position illustrated in FIG. 2 the upper end of tube 44 abuts an enlargement 57 which is fixed to the lower end of control rod 41 of valve 40. As is well known in devices of this type, the control rod 41 of valve 40 is spring biased internally of valve 40 in an upward direction, as viewed in FIG. 2, with a given force, say 30 lbs. by way of example. Extension coil spring 43, with the parts in the position shown in FIG. 2, is pre-loaded with a force in excess of the force of the internal valve spring and, by way of example, this pre-loading may be 40 lbs.

With the parts in the position shown, the valve 40 will be in a neutral blocking position. If cable 42 is drawn downwardly control rod 41 will move downwardly therewith by reason of connection of spring 43 with enlargement 57 of valve control rod 41, against the resistance of the internal valve spring. If, on the other hand, tension in cable 42 is relaxed, the internal valve spring 40 will move the valve control rod upwardly, as viewed in FIG. 2, since under these conditions collar 57, tube 44 and spring 43 act as an integral unit and freely permit such upward adjustment.

Figure 4:
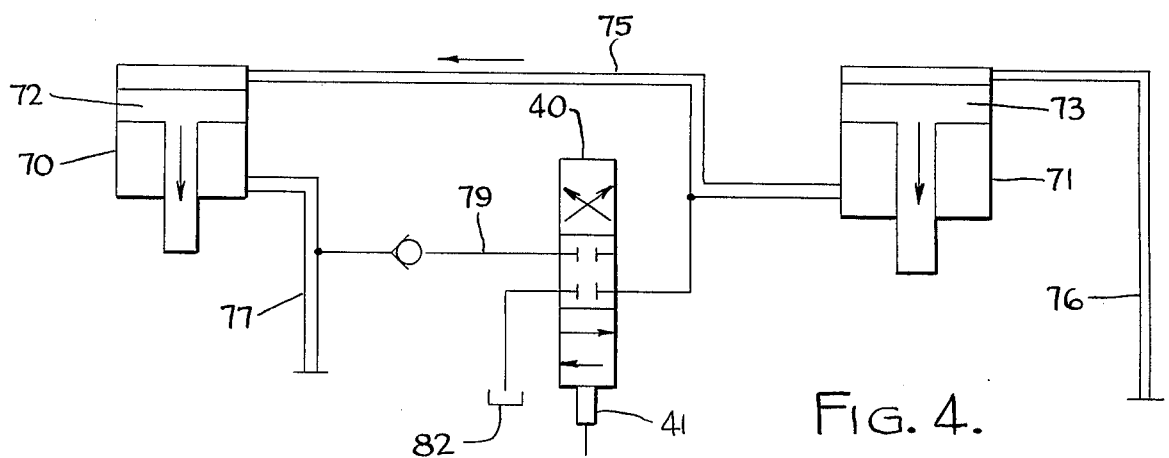
FIG. 4 is a diagrammatic view of the hydraulic circuitry of the rake angle adjusting means.

The manner in which valve 40 operates to change the rake angle of the upper movable shear knife is the same as in my prior U.S. Pat. No. 3,129,625 identified above. Accordingly, the description thereof and the manner in which it operates between the left and right hand hydraulic cylinders of the machine is merely schematically indicated in FIG. 4.

As in conventional hydraulic shears of this general type the left-hand cylinder 70 is of less diameter than the right-hand cylinder 71 so that the area of the left-hand cylinder above its piston 72 is equal to the effective area of right-hand cylinder 71 below its piston 73. A conduit 75 connects between the upper end of cylinder 70 and the lower end of cylinder 71.

In ordinary power strokes of the ram 16 pressure fluid is introduced to the upper end of right-hand cylinder 71 by way of a conduit 76 and fluid is drained from the lower side of cylinder 70 by way of conduit 77. For return upward movement of ram 16 these connections are reversed in a manner which is well understood in this art and need not be further described.

Servo valve 40 which is provided for increasing or decreasing the rake angle corresponds to the servo valve 71 of FIG. 6 of U.S. Pat. No. 3,129,625. It is believed sufficient to the state here that downward movement of the operating member of valve 40 decreases the rake angle of ram 16 while upward movement thereof increases the rake angle.

The four-way valve 40 has a blocked neutral, position wherein no pressure fluid leaves or enters the same. Valve 40 has a mechanical operating member 41 which is variably movable in opposite directions to move the valve proportionately either up or down from its illustrated neutral position. When the valve is moved upwardly fluid pressure from conduit 79 passes by way of conduit 77 to the lower end of cylinder 70, the flow being proportioned to the degree of movement of operating member 41.

At the same time fluid pressure from the conduit 75 which connects the cylinders 70 and 71 is bled through valve 40 to tank 82. Thus movement of the mechanical operator 41 from the neutral position shown in the schematic diagram, causes fluid to be added to the lower end of cylinder 70 and to be bled from conduit 75, thus producing a lower relative position of piston 73 with respect to piston 72, thus increasing the rake angle.

If mechanical operator 41 is moved downwardly, pressure connects through valve 40 to the connecting conduit 75, thus increasing the amount of fluid in the system comprising the lower end of cylinder 71 and the upper end of cylinder 70. This causes piston 72 to assume a lower relative position with respect to piston 73 and a consequent decrease in the rake angle.

In addition, to the general simplicity and convenient adaptability of the foregoing rake-angle adjusting means, the illustrated construction lends itself to the provision of a simple direct-reading rake indicator. As shown in FIG. 1, the upright member or rod 26 is provided with rake indicating graduations and a pointer 84 is fixed to bracket 23 of ram 16. Thus, the pointer indicates the rake adjustment when rod 26 is in normal upright position after a rake adjustment has been effected. Of course, the relative positions of the graduations and the pointer may be reversed as between rod 26 and bracket 23.

A preferred embodiment of this invention having been described herein and illustrated in the drawings, it is to be understood that numerous modifications thereof can be made without departing from the broad spirit and scope of this invention as defined in the appended claims.

I claim:

1. In a power squaring shear having a frame and a reciprocable ram provided with a shear knife and a pair of hydraulic motor devices adjacent to opposite ends of said frame and connected with said ram for effecting working and return strokes thereof; slope control mechanism comprising an upright member normally extending parallel to the direction of reciprocation of said ram and pivoted at one end thereto for angular adjustment in a plane generally parallel to the plane of reciprocation of said shear knife, fluid circuit means for reciprocating said hydraulic motor devices, means for adjusting said upright member on said pivot to vary the angle between said member and said shear knife, fluid means for variably transferring operating fluid to and from said circuit means to advance or retract one of said motor devices relative to the other to adjust the angular disposition of said shear knife, valve means mounted on said frame for controlling said fluid transfer means, a member slidable on said upright member and means restraining the same against vertical movement relative to said frame whereby said slidable member moves horizontally by and upon angular adjustment of said upright member, a cable extending from said valve, and means guiding said cable from said valve to a point of horizontal connection with said slidable member, said valve being in neutral position when said upright member is in a normal position parallel to the direction of reciprocation of said ram.

2. Apparatus according to claim 1 wherein said fluid circuit means connects with said hydraulic motor devices in series to jointly actuate the same and wherein said fluid means for advancing or retracting one of said motor devices relative to the other adds or subtracts hydraulic fluid from said fluid circuit between said motor devices for effecting such advancement or retraction.

3. Apparatus according to claim 2 wherein said valve means acts when said upright member is at angle to the direction of movement of said ram to transfer fluid and thus restore said upright member to normal position with ssaid ram in adjusted angular position.

4. Apparatus according to claim 1 wherein said valve means acts when said upright member is at an angle to the direction of movement of said ram to transfer fluid and thus restore said upright member to normal position with said ram in adjusted angular position.

5. Apparatus according to claim 4 wherein said ram is pivotal in the plane of reciprocation thereof and wherein the means restraining said member slidable on said upright member comprises a block pivoted thereto on an axis parallel to the ram pivot axis and mounted on said frame for free horizontal sliding movement relative thereto.

6. Apparatus according to claim 1 wherein said ram is pivotal in the plane of reciprocation thereof and wherein the means restraining said member slidable on said upright member comprises a block pivoted thereto on an axis parallel to the ram pivot axis and mounted on said frame for free horizontal sliding movement relative thereto.

7. Apparatus according to claim 1 wherein said cable guiding means comprise pulley means.

8. Apparatus according to claim 1 wherein said hydraulic motor devices comprise hydraulic cylinder mounted on said frame, pistons therein, and piston rods connecting with said ram.

* * * * *